(12) United States Patent
Atnip

(10) Patent No.: US 6,397,511 B1
(45) Date of Patent: Jun. 4, 2002

(54) ADJUSTABLE ATTACHMENT DEVICE FOR RODS

(76) Inventor: Ronald Atnip, P.O. Box 993, Cibilo, TX (US) 78108

( * ) Notice: Subject to any disclaimer, the term of this patent is extended or adjusted under 35 U.S.C. 154(b) by 0 days.

(21) Appl. No.: 09/586,389

(22) Filed: Jun. 2, 2000

(51) Int. Cl.⁷ .......................... A01K 87/00; A01K 87/06
(52) U.S. Cl. ................................................ 43/22; 43/23
(58) Field of Search .......................... 43/22, 23, 18.1, 43/20, 25, 18.5

(56) References Cited

U.S. PATENT DOCUMENTS

| | | |
|---|---|---|
| 797,637 A | 8/1905 | Terry |
| 819,500 A | 5/1906 | Bearse |
| 828,557 A | 8/1906 | Levison |
| 1,013,333 A | 1/1912 | Tredwell |
| 2,069,977 A | 2/1937 | Spencer |
| 2,656,639 A | 10/1953 | Phillipson |
| 2,753,646 A | 7/1956 | Colmery |
| 2,780,883 A | 2/1957 | Macy |
| 2,837,858 A | 6/1958 | Benson |
| 3,073,055 A | 1/1963 | Edwards et al. |
| 3,310,904 A | 3/1967 | Binvignat |
| 3,410,016 A | 11/1968 | Arsenault |
| 3,732,644 A | 5/1973 | Kavanagh |
| 3,975,855 A | 8/1976 | McKeown |
| 4,821,447 A * | 4/1989 | Nakayama et al. .......... 43/18.1 |

* cited by examiner

Primary Examiner—Peter M. Poon
Assistant Examiner—Floris C. Copier
(74) Attorney, Agent, or Firm—Kilpatrick Stockton LLP

(57) ABSTRACT

An arrangement for adjustably attaching an article, such as a fishing reel, to a rod. The adjustable attachment arrangement of the present invention comprises at least one mounting zone located above and/or below a rod handle and at least one securement arrangement adapted for attaching at least one article to a rod at one of the mounting zones. For each article, a corresponding securement arrangement is adapted to mount the article to the rod at a mounting zone. Each securement arrangement is configured for longitudinal displacement along at least a portion of said mounting zone allowing a user to at least adjust the weight balance and feel of said rod.

4 Claims, 2 Drawing Sheets

ADJUSTABLE ATTACHMENT DEVICE FOR RODS

TECHNICAL FIELD

The present invention relates generally to the mounting of an article to a rod. More particularly, the present invention relates to an adjustable mounting arrangement configured to releasably secure an article such as a fishing reel by its mounting foot/feet to a fishing rod.

BACKGROUND OF THE INVENTION

There are a number of ways to releasably attach an article to a rod such as a fishing pole. Typically, an article such as a reel is attached to the rod by two hoods or clamps adapted to accept mounting feet carried on the article. Normally, a first hood is permanently fixed to the rod and a second hood is arranged for reciprocating motion on the rod in a way that allows the distance between the two hoods to be increased or decreased for mounting, securing or releasing the article with respect to the rod as required by the user.

Examples of such conventional mounting arrangements are disclosed in U.S. Pat. Nos. 2,069,977; 2,656,639; and 3,732,644 as each relates to fishing poles and reels. As can be appreciated, the weight balance of the article and rod/reel arrangement is controlled by the placement of the fixed hood. Ultimately, the location of an article and the weight balance is predetermined by the manufacturer.

Manufacturers have offered multiple predetermined mounting positions by adding a number of hood pairs in one of the pairs is fixed and the other is moveable with respect to the rod. An example of such a solution is disclosed in U.S. Pat. No. 3,732,644. However, the number of mounting positions is a function of an article's mounting foot length and the hood lengths. While one of the hoods of the pair is moveable, the combination pair is not variably positionable on the fishing rod; that is, the position of reels attached using this arrangement will always be at the same location relative to the fishing rod.

As depicted in U.S. Pat. No. 3,732,644, that invention's mounting of an article is limited to two positions on the rod due to the arrangement of the fixed and slidable hoods. Any advantage gained by the multiple fixed hood arrangement of U.S. Pat. No. 3,732,644, however, is at the expense of adding a number of hoods which in turn increases the complexity and weight of the rod and reel combination. Although the user is presented with a selection of at least two mounting positions, again these positions are predetermined by the manufacturer and controlled by the original and permanent placement of the fixed hoods. In other words, there is no variable positioning made available to the end user; typically a fisherman who often desires to fine tune the balance of the rod and reel combination for optimizing his or her fishing activities.

Conventional securing arrangements, as disclosed by the patents identified above, limit the balance and feel of the arrangement to the fisherman by fixing the accessory at predetermine locations upon the rod. As a result, such devices may be unsuitable for users who prefer to adjust the mounting position of the reel to achieve a customized weight balance and feel personally prescribed. Because of the need for a variously adjustable attachment device for fishing rods, and the fact that have been known before, the opportunity exists for being a sole provider of a mounting arrangement which is not limited to predetermined fixed mounting positions, but instead is variously and continuously adjustable at the end user's discretion.

In view of the above described deficiencies associated with the use of known fixed attachment arrangements for accessories, and especially fishing reels to fishing rods, the present invention has been developed to alleviate these drawbacks and provide further benefits to the user. These enhancements and benefits are described in greater detail hereinbelow with respect to several alternative embodiments of the present invention.

DISCLOSURE OF THE INVENTION

The present invention in its several disclosed embodiments alleviates the drawbacks described above with respect to conventional stationary attachment devices for fishing reels to fishing rods and incorporates several additionally beneficial features by providing a light weight, corrosion resistant, continuously adjustable and user configurable attachment arrangement for mounting accessories to fishing rods. The adjustable attachment arrangement of the present invention comprises at least one mounting zone located above and/or below a handle portion of a fishing rod and at least one anchor arrangement that is adapted for attaching at least one article to the rod at one of the mounting zones. For each article such as a fishing reel to be mounted to the fishing rod, a corresponding anchor arrangement is provided and adapted to mount that article to the rod at a mounting zone. Each anchor arrangement is configured for longitudinal displacement across at least a portion of a respective mounting zone. This allows the operator to adjust the position of the article, such as a reel, with respect to the rod.

An added benefit of the present invention, at least according to one preferred embodiment, is the accommodation of gross and/or micro adjustments of the position of the reel both longitudinally, as well as possibly radially, with respect to the fishing rod. Moreover, the nature of the enabled adjustment is continuous over a predetermined range thereby enabling fine tuning of the mounting position relative to the rod.

The beneficial effects described above apply generally to each of the exemplary devices and mechanisms disclosed herein as they relate to the mounting of fishing reels to fishing rods. The specific structures through which these benefits are delivered will be described in detail hereinbelow.

BRIEF DESCRIPTION OF THE DRAWINGS

The invention will now be described in greater detail in the following way of example only and with reference to the attached drawings, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
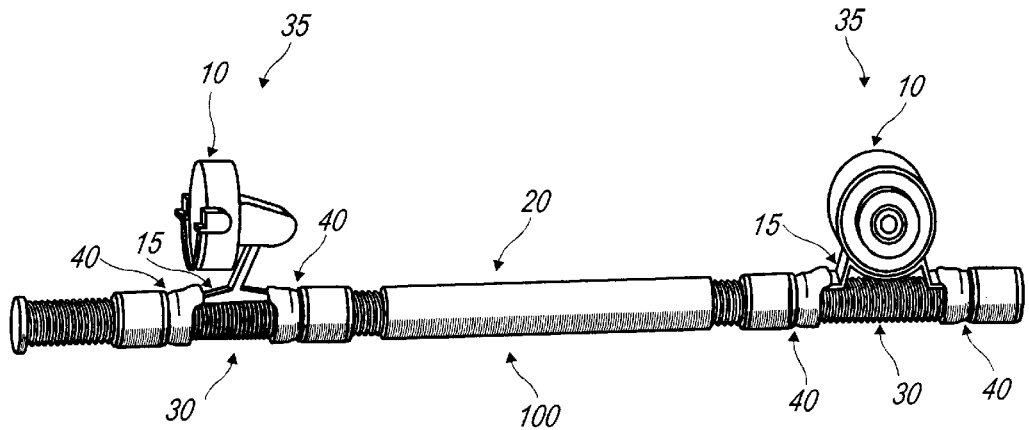
FIG. 1 shows an elevational side view of an adjustable attachment device for a rod configured according to the present invention and having a first fishing reel releasably attached to the fishing rod by a variably positionable anchor arrangement located above a handle portion of the rod and a second fishing reel releasably attached to the fishing rod by a similar mounting arrangement positioned below the handle portion.

FIG. 1 illustrates an adjustable attachment device (100) for a rod (05) having a handle portion (20) between two mounting zones (30). In this preferred embodiment, the rod (05) takes the form of a fishing rod (05). According to the present invention, at least one mounting zone (30) is located on the rod (05), and preferably adjacent to a handle portion (20). Each mounting zone (30) is configured for receiving an article (10). Articles (10) are attached to mounting zones (30) by either a securement arrangement (40) or a fixed mounting arrangement (70). In this, a preferred embodiment, the article (10) takes the form of a fishing reel (10) for fishing line.

The cross sectional profile of a rod (05) can be circular, elliptical, polygonal or combinations of these shapes. Furthermore, a rod (05) can be solid, hollow, or a combination thereof and made of any lightweight corrosion resistant material such as, but not limited to, non-ferrous materials, composite materials, fiberglass, carbon fiber, kevlar, bamboo, aluminum, or combinations thereof. An article (10) should be understood, however, to encompass any appurtenance which an operator may wish to attach to a rod, such as, but not limited to fishing reels, weights, arm or hand supports, carrying straps, writing surfaces, carrying compartments, instrumentation, recording devices, electromagnetic receiving devices, electromagnetic transmitting devices, electromagnetic generating devices, sound receiving devices, sound transmitting devices, sound generating devices, or any combination thereof, as well as others of similar characteristics and/or service to a fisherman.

Figure 2:
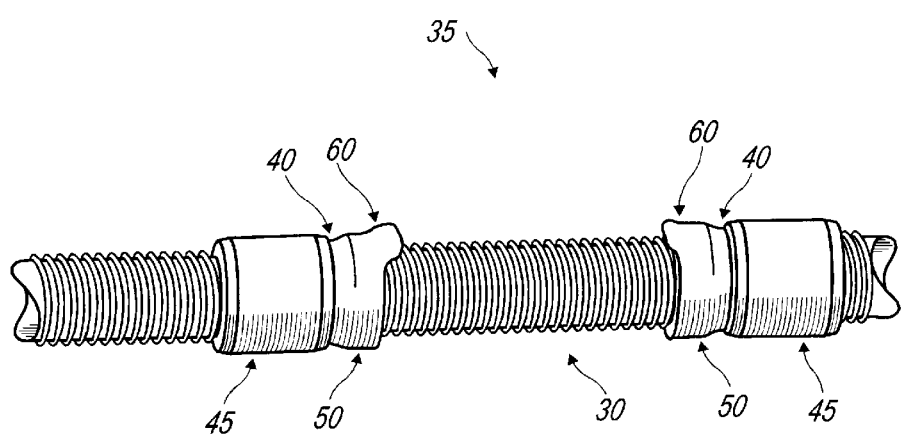
FIG. 2 shows a detailed elevational view of an adjustable attachment arrangement for a fishing rod constructed according to the present invention for accommodating releasable and adjustable attachment of a fishing reel to a fishing rod by an anchor arrangement having hoods configured to establish opposed annular receivers.

FIG. 2 depicts in greater detail one of the two anchor arrangements (35) of FIG. 1, and which comprises two securement arrangements (40), that is adapted to attach an article (10), such as a reel (10), upon an elongate member (05), such as a fishing rod (05). The arrangement (35) is further configured to allow selection of the location of attachment of the reel (10) along an adjustment range or region of a mounting zone (30). Two securement arrangements (40) are depicted in FIG. 2 and each comprise two primary components. A first component of the arrangement (40) is a sleeve (50) upon which an exterior foot receiver (60) is carried (or in which the foot receiver (60) is formed) and which preferably has a longitudinally oriented interior groove for accommodating sliding engagement over a longitudinal ridge or spline of the rod (05) that is oriented lengthwise at least across the range of adjustment of the mounting zone (30) of the rod (05). When the spline, which is essentially permanently and fixedly mounted to the rod (05) at the mounting zone (30) and the cooperating groove on the underside of the sleeve (50) are engaged upon each other, longitudinal movement of the sleeve (50) along at least a portion of the mounting zone (30) is accommodated, but rotation of the sleeve (50) about the longitudinal axis of the fishing rod (05) is effectively prevented. A second component of the arrangement (40) is a carrier (45) that is slip-connected in an end-to-end configuration to the sleeve (50). The carrier (45) is threaded at an interior surface thereof for threaded mating engagement upon a complementarity threaded exterior surface of the mounting zone (30). The carrier (45) is arranged for rotational motion upon threads found on an exterior surface of the mounting zone (30) that results in longitudinal movement of the arrangement (40) across the mounting zone (30).

When the two securement arrangements (40) are configured in the manner as described immediately above and as shown in FIG. 2, either mounting (40) can be utilized to close the distance between the two mounts (40) thereby fixing a reel (10) to the rod (05) in a conventional manner. But, together the two securement arrangements (40) can also be simultaneously moved to change the relative mounting position of the reel (10) to the rod (05).

The threaded configuration permits both macro and micro adjustment of the relative position of the reel (10) on the rod (05) to suit any users preference for general placement the reel (10), as well longitudinal fine tuning for very specific weight balances desired by sensitive fishermen.

In FIG. 2, an article (10) is releasably attached to the rod (05) by a pair of opposed annular receivers (60) typically configured into the pair of the sleeves (50) of the anchor arrangement (35). The annular receivers (60) are configured for accepting and holding a sufficient portion of the article (10). In the preferred and illustrated embodiment, this corresponds to a mounting foot (15) of a fishing reel (10).

As depicted in FIG. 1, two or more reels (10) may be attached to the rod (5), but normally at different locations. In this illustration, one reel (10) is typically utilized for fly fishing, while the other is utilized for normal cast or drop-line fishing. Because two mounting locations are available, and by nature the two different types of reels are usually located on opposite sides of the rod handle (20), there is no need to switch out the two reels (10) for the two different types of fishing. Both reels (10) can be maintained on the rod at all times. Regardless, because continues adjustment of the position of each reel (10) along the mounting zones (30) of the rod (05) is accommodated, unique balances can be achieved and fine tuned to the fisherman's preference. These are features that heretofore have not been facilitated by known rod and reel designs.

In an alternative embodiment, and one which has not been illustrated, multiple sets of anchor arrangements (35) may be positioned on a give mounting zone (30) for fixing multiple articles (10) to the rod (05) at that location. Still further, the splined feature of the sleeve (50) may be deleted so that variable and adjustable radial positioning of article(s) (10) about the rod (05) is accommodated. Regardless, utilization of the design teachings of the present invention make adjustment and fine tuning of the relative position of each of the reels (10) upon the rod (05) easy to accomplish.

Figure 3:
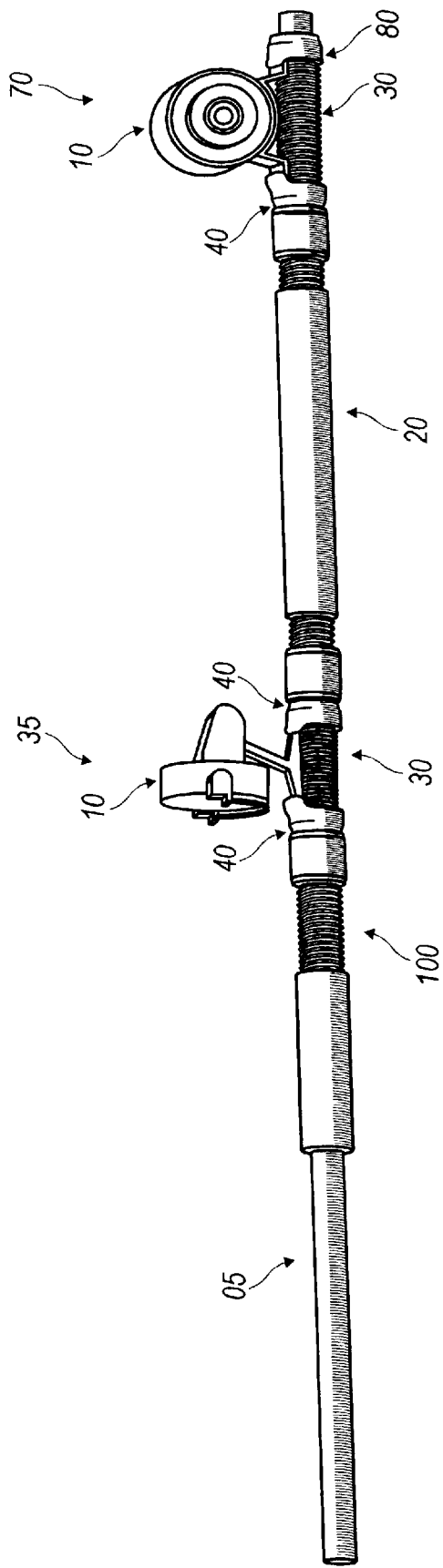
FIG. 3 shows an elevational side view of an adjustable attachment device for a rod configured according to the present invention and having a first fishing reel releasably attached to the fishing rod by a variably positionable anchor arrangement located above a handle portion of the rod and a second fishing reel releasably attached to the fishing rod by a fixed position mounting arrangement located below the handle portion.

FIG. 3 illustrates a combination of a fixed mounting arrangement (70) adapted for releasably attaching an article (10) to a rod (05) at a predetermined position on a mounting zone (30) between a fixed mounting point (80) and a movable securement arrangement (40) as described above. In the embodiment of FIG. 3, the reel (10) below (to the right of) the handle portion (20) has a position fixed relative to the rod (05), while the reel (10) above (to the left of) the handle portion (20) is positionally adjustable relative to the rod (05). This arrangement is indicative of the fact that the preferences of some fisherman can be accomplished utilizing only one adjustable connection, while others will demand that both reels (10) be movable once they experience the accommodating nature of this invention's design.

An adjustable attachment device for fishing rods and their reels have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

INDUSTRIAL APPLICABILITY:

The present invention finds applicability in the sport fishing industries, and in those industries that supply fishing tackle and accessories for fishing purposes.

What is claimed and desired to be secured by Letters Patent is as follows:

1. An arrangement for adjustably and releaseably attaching two articles to a fishing rod, said arrangement comprising:
    a fishing rod having a handle portion and two mounting zones, each mounting zone configured for receiving an article thereupon;
    an anchor arrangement located upon each of said two mounting zones, each anchor arrangement attaching an article to said rod at a respective one of said two mounting zones; and
    at least one of said anchor arrangements being configured for continuous longitudinal displacement upon said fishing rod across at least a portion of said mounting zone for accommodating positional adjustment of said article relative to said fishing rod.

2. The arrangement as recited in claim 1, wherein both of said two anchor arrangements are configured for continuous longitudinal displacement upon said fishing rod across at least a portion of a respective one of said two mounting zones.

3. The arrangement as recited in claim 2, wherein each of said two mounting zones are located adjacent to, but on opposite sides of said handle portion.

4. The arrangement as recited in claim 1, wherein at least one of said articles is selected from the group consisting of a fly fishing reel and a conventional drop-line fishing reel, and the other one of said articles is selected from the group consisting of a conventional drop-line fishing reel, a fly fishing reel, weights, hand supports, arm supports, carrying straps, writing surfaces, carrying components, instrumentation, recording devices, electromagnetic receiving devices, electromagnetic transmitting devices, electromagnetic generating devices, sound receiving devices, sound recording devices, sound transmitting devices, and sound generating devices.

* * * * *